US009938800B2

(12) United States Patent
Karale et al.

(10) Patent No.: US 9,938,800 B2
(45) Date of Patent: Apr. 10, 2018

(54) METHODS AND SYSTEMS FOR DETERMINING ACIDIZING FLUID INJECTION RATES

(71) Applicant: Halliburton Energy Services, Inc., Houston, TX (US)

(72) Inventors: Chaitanya Mallikarjun Karale, Pune (IN); Prabhat Kumar Srivastava, Pune (IN); Ankit Bhatnagar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/108,228

(22) PCT Filed: Jun. 2, 2015

(86) PCT No.: PCT/US2015/033773
§ 371 (c)(1),
(2) Date: Jun. 24, 2016

(87) PCT Pub. No.: WO2016/164056
PCT Pub. Date: Oct. 13, 2016

(65) Prior Publication Data
US 2017/0107796 A1 Apr. 20, 2017

(30) Foreign Application Priority Data
Apr. 9, 2015 (IN) .............................. 995/DEL/2015

(51) Int. Cl.
*E21B 41/00* (2006.01)
*E21B 43/25* (2006.01)
(Continued)

(52) U.S. Cl.
CPC ............ *E21B 41/0092* (2013.01); *C09K 8/60* (2013.01); *C09K 8/72* (2013.01); *E21B 43/25* (2013.01); *E21B 49/00* (2013.01)

(58) Field of Classification Search
CPC ...... E21B 43/25; E21B 43/26; E21B 41/0092; E21B 49/00; C09K 8/72; C09K 8/60
See application file for complete search history.

(56) References Cited

U.S. PATENT DOCUMENTS 4,487,265 A * 12/1984 Watanabe ................ C09K 8/60
166/307
5,207,778 A * 5/1993 Jennings, Jr. ............ C09K 8/74
166/281

(Continued)

FOREIGN PATENT DOCUMENTS

JP 2010-264251 A 11/2010

OTHER PUBLICATIONS

Jones, A. T., and D. R. Davies. "Quantifying acid placement: The key to understanding damage removal in horizontal wells." SPE Paper 31146, SPE Formation Damage Control Symposium. Society of Petroleum Engineers, 1996.

(Continued)

*Primary Examiner* — Daniel P Stephenson
(74) *Attorney, Agent, or Firm* — Craig Roddy; Baker Botts L.L.P.

(57) ABSTRACT

Methods and systems for determining acidizing fluid injection rates for stimulation of a subterranean formation are provided. In one embodiment, methods comprise: selecting a first injection rate for injecting an acidizing fluid into a subterranean formation; calculating a first objective function based on the first injection rate; selecting a second injection rate for injecting the acidizing fluid into the subterranean formation; calculating a second objective function based on the second injection rate; comparing the second objective function with the first objective function to determine whether the second objective function is indicative of more effective stimulation, less effective stimulation, or the same (Continued)

stimulation as the first objective function; and selecting a design rate for injecting the acidizing fluid into the subterranean formation.

18 Claims, 10 Drawing Sheets

(51) Int. Cl.
*E21B 49/00* (2006.01)
*C09K 8/60* (2006.01)
*C09K 8/72* (2006.01)

(56) References Cited

U.S. PATENT DOCUMENTS

| | | | |
|---|---|---|---|
| 5,441,929 A * | 8/1995 | Walker | C09K 8/54 166/307 |
| 5,458,192 A | 10/1995 | Hunt | |
| 6,196,318 B1 | 3/2001 | Gong et al. | |
| 6,668,922 B2 | 12/2003 | Ziauddin et al. | |
| 6,810,960 B2 * | 11/2004 | Pia | E21B 7/28 166/312 |
| 7,561,998 B2 | 7/2009 | Panga et al. | |
| 7,603,261 B2 | 10/2009 | Tardy | |
| 7,657,415 B2 | 2/2010 | Panga et al. | |
| 7,774,183 B2 * | 8/2010 | Tardy | E21B 43/25 166/252.5 |
| 7,853,440 B2 | 12/2010 | Cohen et al. | |
| 8,016,034 B2 | 9/2011 | Glasbergen et al. | |
| 9,098,889 B2 * | 8/2015 | Zhao | G06T 7/0004 |
| 9,482,079 B2 * | 11/2016 | Li | E21B 43/16 |
| 9,670,753 B2 * | 6/2017 | Filippov | E21B 41/0092 |
| 2013/0192837 A1 | 8/2013 | Curtis et al. | |
| 2017/0107796 A1 * | 4/2017 | Karale | C09K 8/60 |

OTHER PUBLICATIONS

PetroWiki, "Acid placement and coverage" found at http://petrowiki.org/Acid_placement_and_coverage#cite_note-r12-11.

Glasbergen, Gerard, and Marten Buijse. "Improved Acid Diversion Design Using a Placement Simulator (Russian)." SPE Paper 102412, SPE Russian Oil and Gas Technical Conference and Exhibition. Society of Petroleum Engineers, 2006.

Glasbergen, G., N. Kalia, and M. Talbot. "The Optimum Injection Rate for Wormhole Propagation: Myth of Reality? Paper SPE 121464 presented at the SPE European Formation Damage Conference, Scheveningen, The Netherlands, May 27-29." (2009).

International Search Report and Written Opinion issued in related PCT Application No. PCT/US2015/033773 dated Jan. 22, 2016, 10 pages.

Talbot, Malcolm Seth, and Rick David Gdanski. "Beyond the Damkohler number: a new interpretation of carbonate wormholing." SPE Paper 113042, Europec/EAGE Conference and Exhibition. Society of Petroleum Engineers, 2008.

Mahmoud, Mohamed Ahmednasreldin, and Hisham A. Nasr-El-Din. "Modeling of the Flow of Chelating Agents in Porous Media in Carbonate Reservoirs Stimulation." SPE Paper 150065, North Africa Technical Conference and Exhibition. Society of Petroleum Engineers, 2012.

Ramondenc, Pierre, Bruno Lecerf, and Philippe Michel Jacques Tardy. "Achieving Optimum Placement of Stimulating Fluids in Multilayered Carbonate Reservoirs: A Novel Approach." SPE Paper 166184, SPE Annual Technical conference and Exhibition. Society of Petroleum Engineers, 2013.

Ahmed, D., et al. "An Innovative Approach to Forecasting Matrix Stimulation Treatment Results: A Case Study." SPE Paper 168157, SPE International Symposium and Exhibition on Formation Damage Control. Society of Petroleum Engineers, 2014.

Buijse, M. A., and G. Glasbergen. "A Semiempirical Model to Calculate Wormhole Growth in Carbonate Acidizing. SPE Paper 96892, SPE Annual Technical Conference and Exhibition". Society of Petroleum Engineers, 2005.

Fredd, Christopher N., and H. Scott Fogler. "Influence of transport and reaction on wormhole formation in porous media." AIChE journal 44.9 (1998): 1933-1949.

Fredd, C. N., and H. S. Fogler. "Optimum conditions for wormhole formation in carbonate porous media: Influence of transport and reaction." SPE Paper 56995, SPE Journal 4.03 (1999): 196-205.

International Preliminary Report on Patentability issued in related PCT Application No. PCT/US2015/033773, dated Oct. 19, 2017 (7 pages).

* cited by examiner

METHODS AND SYSTEMS FOR DETERMINING ACIDIZING FLUID INJECTION RATES

CROSS-REFERENCE TO RELATED APPLICATION

The present application is a U.S. National Stage Application of International Application No. PCT/US2015/033773 filed Jun. 2, 2015 which claims priority to Indian Patent Application No. 995/DEL/2015 filed on Apr. 9, 2015, both of which are incorporated herein by reference in their entirety for all purposes.

BACKGROUND

The present disclosure relates to methods for use in subterranean formations, and more specifically, methods for determining acidizing fluid injection rates for stimulation of a subterranean formation.

Hydrocarbons, such as oil and gas, are commonly obtained from subterranean formations that may be located onshore or offshore. The development of subterranean operations and the processes involved in removing hydrocarbons from a subterranean formation typically involve a number of different steps such as, for example, drilling a wellbore at a desired well site, treating the wellbore to optimize production of hydrocarbons, and performing the necessary steps to produce and process the hydrocarbons from the subterranean formation.

Acid treatments are used to stimulate and increase the production of hydrocarbons in a subterranean formation comprising acid-soluble components, such as those present in carbonate and sandstone formations. This is commonly referred to as acidizing. One such aqueous acid treatment, referred to as "matrix acidizing," involves the introduction of an acid into a subterranean formation under pressure so that the acid flows through the pore spaces of the formation. The acid of the aqueous acid treatment reacts with acid soluble materials contained in the formation to increase the size of the pore spaces and increase the permeability of the formation.

In carbonate formations, matrix acidizing creates conductive flow channels known as wormholes that bypass the damage in the formation. The wormholes are formed when the matrix of the porous and permeable rock is dissolved by reactive fluids. The fluid injection rate is an especially important consideration in developing deep penetrating wormholes. When the injection rate is too low, the acidizing fluid may only dissolve the rock in the vicinity of the wellbore and wormholes may not form. When the injection rate is too high, the treatment may form thick and shallow wormholes that do not penetrate deep enough into the formation.

Traditionally, treatment fluids associated with acid treatments such as matrix-acidizing are injected at the maximum pressure differential and injection rate ("MAPDIR"). While this injection rate is simple, it uses large volumes of acid, is limited by pump and tubing capacity, and may not achieve optimal stimulation of the subterranean formation.

BRIEF DESCRIPTION OF THE DRAWINGS

These drawings illustrate certain aspects of some of the embodiments of the present disclosure and should not be used to limit or define the claims.

Figure 1:
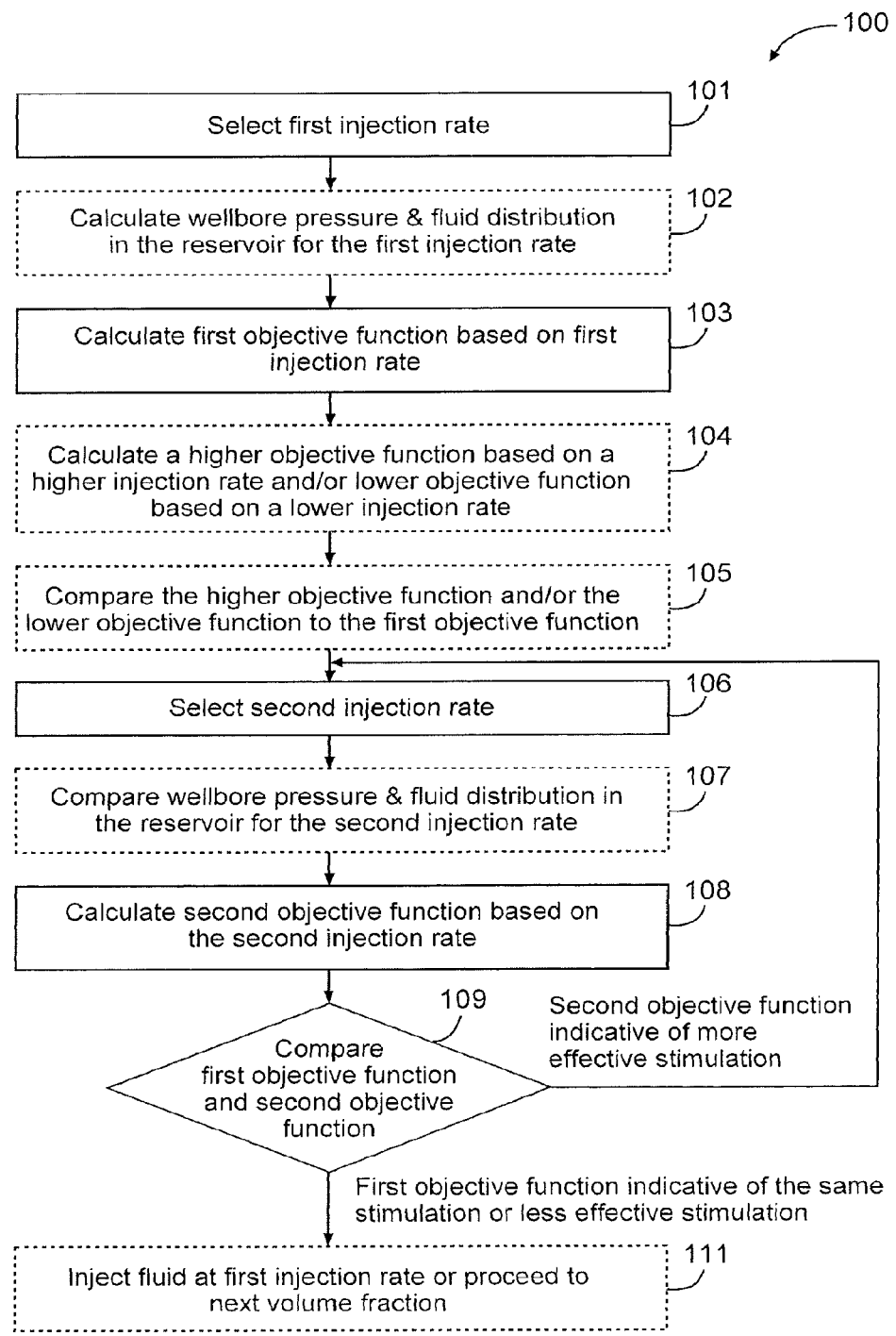
FIG. 1 is a process flow diagram illustrating a method for determining an injection rate for an acidizing treatment fluid according to certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

As used herein, "volume fraction" refers to a fraction of the total volume of a fluid used in a subterranean formation operation. Use of this term does not imply any particular number of volume fractions. For example, in certain embodiments, there could be one volume fraction, ten volume fractions, one hundred volume fractions, or any other suitable number of fractions. Volume fractions may make up equal portions of the volume or nonequal portions of the volume. Use of this term is directed to theoretical fractions of the fluid volume, and does not necessarily imply any physical division.

The present disclosure relates to methods for use in subterranean formations, and more particularly, methods for determining acidizing fluid injection rates for stimulation of subterranean formations.

More specifically, the present disclosure provides methods comprising: selecting a first injection rate for injecting an acidizing fluid into a subterranean formation; calculating a first objective function based on the first injection rate; selecting a second injection rate for injecting the acidizing fluid into the subterranean formation; calculating a second objective function based on the second injection rate; comparing the second objective function with the first objective function to determine whether the second objective function is indicative of more effective stimulation, less effective stimulation or the same stimulation as the first objective function; if the second objective function is indicative of more effective stimulation than the first objective function, then comparing the second objective function to a third objective function calculated based on a third injection rate; and if the second objective function is indicative of the same stimulation or less effective stimulation than the first objective function, then selecting a design rate for injecting the acidizing fluid into the subterranean formation based on the first injection rate. In certain embodiments, calculating objective functions comprises determining a wellbore pressure and a fluid distribution. In certain embodiments, the present disclosure also provides methods for stimulating a subterranean formation that comprise injecting an acidizing fluid into the subterranean formation at an injection rate calculated based on the methods described herein.

In certain embodiments, if the third objective function is indicative of more effective stimulation than the second objective function, the methods of the present disclosure further comprise: repeating the steps of selecting an injection rate, calculating an objective function, and comparing the objective functions for additional injection rates.

In some embodiments, the selecting, calculating, and comparing steps are performed for each of a plurality of volume fractions to determine a design rate profile. In some embodiments, the method further comprises injecting the acidizing fluid into the subterranean formation according to the design rate profile.

In certain embodiments, the present disclosure provides methods comprising: selecting one or more preliminary indicators; determining one or more numeric values for the preliminary indicator for an acidizing fluid and a subterranean formation; comparing the one or more numeric values for the preliminary indicators to one or more preliminary indicator thresholds; determining based on the comparison of the numeric values for the preliminary indicators and the preliminary indicator thresholds whether to inject the acidizing fluid according to a maximum pressure differential and injection rate or according to one of a design rate or a design rate profile; and injecting the acidizing fluid according to the design rate, design rate profile, or the maximum pressure differential and injection rate.

Among the many potential advantages to the methods and compositions of the present disclosure, only some of which are alluded to herein, the methods of the present disclosure may provide improved methods for determining injection rates or rate profiles for acidizing treatments. For example, in certain embodiments, the calculated injection rates or injection rate profiles of the present disclosure may significantly increase stimulation as compared to traditionally-determined injection rates. In some embodiments, the present disclosure may provide methods for determining injection rates faster and more efficiently then existing methods, saving time and computational power. In some embodiments, the methods of the present disclosure may be used during injection to provide updated real-time adjustments to an injection rate or rate profile.

FIG. 1 depicts a process flow 100 for determining an injection rate or rate profile for an acidizing treatment. The use of arrows in FIG. 1 is not meant to require any particular order in which the methods of the present disclosure must be performed, and any order of performing these steps is contemplated by the present disclosure and claims. In certain embodiments, the method comprises selecting a first injection rate 101, calculating a first objective function based on the first injection rate 103, selecting a second injection rate 106, calculating a second objective function based on the second injection rate 108, and comparing the second objective function to the first objective function calculated based on the first injection rate 109. In some embodiments, the process flow 100 may comprise calculating wellbore pressure and fluid distribution for a first injection rate 102 and/or calculating wellbore pressure and fluid distribution for the second injection rate 107. Generally, any of the steps of process flow 100 may be implemented by a processor of an information handling system executing software in the form of computer readable instructions stored in a memory device coupled to the processor.

In some embodiments, the process flow 100 may comprise calculating a higher objective function based on a higher injection rate and selecting a second injection rate 106 based on the higher objective function. In certain embodiments, the process flow 100 may comprise calculating a lower objective function based on a lower injection rate 104, and selecting a second injection rate 106 based on the lower objective function. In some embodiments, calculating the higher and/or lower objective functions 104 may comprise calculating wellbore pressure and fluid distribution in a manner similar to steps 102 and 107. In certain embodiments, the lower objective function and/or the higher objective function may be compared to the first objective function 105 in order to select the second injection rate 106.

In some embodiments, the acidizing treatment fluid may be injected at the injection rate determined by the process flow 100. In certain embodiments, it may be necessary to repeat steps 106-110 to determine the injection rate. In certain embodiments, the total volume of the acidizing fluid may be divided into finite volume fractions. In some embodiments, the total volume is divided into equal volume fractions. In certain embodiments, this process 100 can be performed for each volume fraction to determine a design rate profile, which is simply a combination or series of rates at which the fluid is injected at step 111. In certain embodiments, the acidizing treatment fluid may be injected into a wellbore or subterranean formation according to the design rate profile.

Any injection rate may be selected as the first injection rate 101. For example, in certain embodiments, the highest allowable injection rate can be used as the first injection rate.

In some embodiments, the lowest allowable rate may be used as the first injection rate. In certain embodiments, the first injection rate may be between the highest allowable injection rate and the lowest allowable injection rate. In certain embodiments, the highest or lowest allowable rate may depend on the constraints of the system, fluids, and/or equipment. If step 101 is carried out for a subsequent volume fraction, the previous volume fraction injection rate may be selected 101 as the first injection rate. The highest allowable injection rate may be decreased 106 to determine the second injection rate. In some embodiments, the injection rate may be increased and decreased to determine the second injection rate 106 within the constraints of the system.

In certain embodiments, the wellbore pressure and fluid distribution in the reservoir may be calculated 102. In certain embodiments, a numerical model may be used to calculate fluid distribution and wellbore pressure. For example, in certain embodiments, a pseudo-steady-state model may be used to calculate the wellbore pressure and fluid distribution in the reservoir. For such a model, at each injection rate, the pressure and the flow rates both along the wellbore and into the formation are calculated at discrete points along the wellbore, subject to specified pressure and flow boundary conditions. Wellbore pressure depends on the flow rate along the wellbore, the hydrostatic head of the acidizing fluid, the wellbore configuration and completion details, and the leakoff rate into the formation. In some embodiments, the pressure drop along the wellbore at a point z due to a flow rate along the wellbore q is given by Equation (1):

$$\frac{\partial p_w}{\partial z} = F(q) + \rho g \cos\theta \qquad (1)$$

where $p_w$, is wellbore pressure, F is the sum of the frictional and inertial pressure drops, and $\rho g \cos\theta$ is hydrostatic head of a fluid of density $\rho$. Frictional pressure drop depends on wellbore geometry, fluid rheology, and the flow regime, and can be written in terms of experimentally or theoretically derived expressions.

Calculating flow distribution requires calculating the pressure drop in the formation between the reservoir and the wellbore. The pressure gradient in the formation depends on the flow rate into the formation, the formation properties, the fluid properties, and the radial position from the wellbore. In certain embodiments, to calculate the pressure drop between the reservoir and the wellbore, the formation is divided radially into different regions, each having constant formation and fluid properties. In certain embodiments, the formation has regions of varying permeability. In some embodiments, such regions can be determined from the calculated position of the fluid fronts and the initial permeability profile.

For a given injection rate (flow rate), pressure drop may be determined for each region using the region's characteristic permeability together with Darcy's law for a Newtonian fluid, a modified form of Darcy's law for power-law fluids, or a line-source pressure distribution for the compressible reservoir fluids.

The difference between the wellbore pressure and the average reservoir pressure is given by the sum of all the individual pressure drops for these regions, which for a flow rate q along the wellbore is given by Equation (2):

$$p_w(z) - p_\infty(z) = -\alpha(z)\frac{\partial q}{\partial z} + \beta(z)\left(\frac{\partial q}{\partial z}\right)^n + \chi(z) \qquad (2)$$

where $(-\partial q/\partial z)$ is the corresponding flow rate into the formation at the point z, the terms $\alpha(z)$ and $\beta(z)$ are due to the instantaneous resistance to flow of the displaced fluid and the injected fluid, respectively, and the term $\chi(z)$ includes all terms due to the compression history of the displaced fluid. Flow distribution is determined at each injection rate by solving Equations (1) and (2) for $p_w(z)$ and $q(z)$ subject to pressure and flow-rate boundary conditions.

Referring back to FIG. 1, in some embodiments, an objective function 103 is calculated based on the first injection rate. In certain embodiments, an objective function may be any mathematical function indicative of an objective of the treatment. Examples of objective functions that may be suitable for some embodiments of the present disclosure include, but are not limited to a total interval skin function, a total wellbore skin function, a individual layer skin function, a wormhole penetration function, a cumulative wormhole penetration function, a function for fluid placement in a layer, and any combination thereof. For example, in some embodiments, the objective may be minimum total interval skin, minimum total wellbore skin, minimum individual layer skin, maximum wormhole penetration, cumulative wormhole penetration, maximum fluid placement in a layer, reaching a particular value of total interval skin individual layer skin, any other suitable objective, or any combination thereof. In certain embodiments, the objective function may depend on wellbore pressure, fluid distribution, and the injection rate.

As used herein, "skin" is a dimensionless factor calculated to determine the production efficiency of a well by comparing actual conditions with theoretical or ideal conditions. A positive skin value indicates some damage or influences that are impairing well productivity. A negative skin value indicates enhanced productivity, typically resulting from stimulation. As used herein, the term "layer" does not imply or require a region of any particular shape, length, thickness, and/or continuity. Consistent with the present disclosure, a layer may comprise a single contiguous region or shape.

In certain embodiments, a second injection rate is selected 106. The second injection rate may be any injection rate other than the first injection rate. In some embodiments, the second injection rate may be selected by increasing or decreasing the first injection rate. For example, in some embodiments, the first injection rate is the maximum allowable injection rate and the second injection rate is less than the maximum allowable injection rate. In some embodiments, the first injection rate may be the lowest allowable injection rate and the second injection rate is greater than the lowest allowable injection rate.

In certain embodiments, steps 104 and 105 are performed to determine whether to increase or decrease the first injection rate to select a second injection rate 106. In certain embodiments, a higher objective function is calculated based on an injection rate higher than the first injection rate 104. In certain embodiments, a lower objective function is calculated based on an injection rate lower than the first injection rate 104. In certain embodiments, the higher and/or lower objective functions are calculated 104 in a similar manner as the first objective function 103. In some embodiments, calculating the objective functions 104 may comprise calculating wellbore pressure and fluid distribution in the reservoir (not shown) in a manner similar to step 102. In some embodiments, the higher and/or lower objective functions are compared to the first objective function 105. In certain embodiments, the higher and/or lower objective functions may be compared to each other (not shown). In certain embodiments the second injection rate is selected 106 based on the comparison of the objective functions. For example, if the lower objective function is indicative of more effective stimulation than the first objective function, then the second injection rate may be selected by decreasing the first injection rate or if the higher objective function is indicative of more effective stimulation than the first objective function, then second injection rate may be selected by increasing the first injection rate.

In some embodiments, the wellbore pressure and fluid distribution in the reservoir is calculated for the second injection rate 107 in the same manner as it was calculated for the first injection rate in step 102.

In certain embodiments, the second objective function is calculated based on the second injection rate 108. In certain embodiments, the second objective function is compared to the first objective function 109. In certain embodiments, the objective functions are compared 109 to determine whether the second objective function is indicative of more effective stimulation of the treatment interval. In certain embodiments, more effective stimulation of the treatment interval may be indicated by lower total interval skin, lower individual layer skin, greater wormhole penetration, improved fluid distribution, any other metric that indicates more effective stimulation, or any other suitable metric.

In certain embodiments, if the second objective function is indicative of more effective stimulation than the first objective function, steps 106-109 may be repeated for a third injection rate. The third injection rate may be selected in the same manner as step 106, and a third objective function may be calculated (similar to step 108) and compared to the second objective function (similar to 109). In certain embodiments, steps 106-109 may be repeated for additional injection rates until an objective function is indicative of the same stimulation or less effective stimulation 111.

For example, the objective function may be minimum total skin for the treatment interval. In that example, if the total skin of the treatment interval for the second injection rate is lower than the total skin for the first injection rate, then the total skin of the treatment interval for the second injection rate may be indicative of more effective stimulation of the treatment interval. In certain embodiments, a third injection rate would be selected, the total skin of the treatment interval for the third injection rate would be calculated, and the total skin of the treatment interval for the second injection rate and third injection rate would be compared. In some embodiments, additional injection rates may be selected and their corresponding total skin values may be compared until the total skin of treatment interval for an injection rate is indicative of the same stimulation or less effective stimulation than the total skin of the treatment interval for the prior injection rate.

In certain embodiments, if the total skin of the treatment interval for the second injection rate is higher than the total skin of the first injection rate, then the total skin of the treatment interval for the second injection rate may be indicative of the same stimulation or less effective stimulation than the total skin of the treatment interval for the first injection rate. In certain embodiments, a design rate would then be selected for injecting an acidizing fluid into the subterranean formation based on the first injection rate. In certain embodiments, the design rate would then be used to inject the treatment fluid into the wellbore.

In certain embodiments, if the second objective function is indicative of the same stimulation or less effective stimulation than the first objective function, then the first injection rate may be used as the design rate for the first volume fraction. In some embodiments, a single injection rate or design rate may be used for the entire fluid volume. In certain embodiments, the process 100 may be performed for the other volume fractions to determine an design rate profile. In certain embodiments, steps 104-105 may also be repeated for other volume fractions. In some embodiments, the first injection rate for a subsequent volume fraction may be the design rate of the previous volume fraction. In certain embodiments, an acidizing fluid may be injected into a subterranean formation according to the design or design rate profile determined by the process 100.

In certain embodiments, fluids may be injected according to a combination of the design rate, design rate profile, and/or the MAPDIR during an acidizing treatment. In some embodiments, an acidizing fluid may be injected according to the MAPDIR for some volume steps and according to an injection rate determined according to process 100 for other volume steps. In certain embodiments, a diverting fluid may be injected according to the MAPDIR and an acidizing fluid may be injected according to a design rate or a design rate profile.

Figure 2:
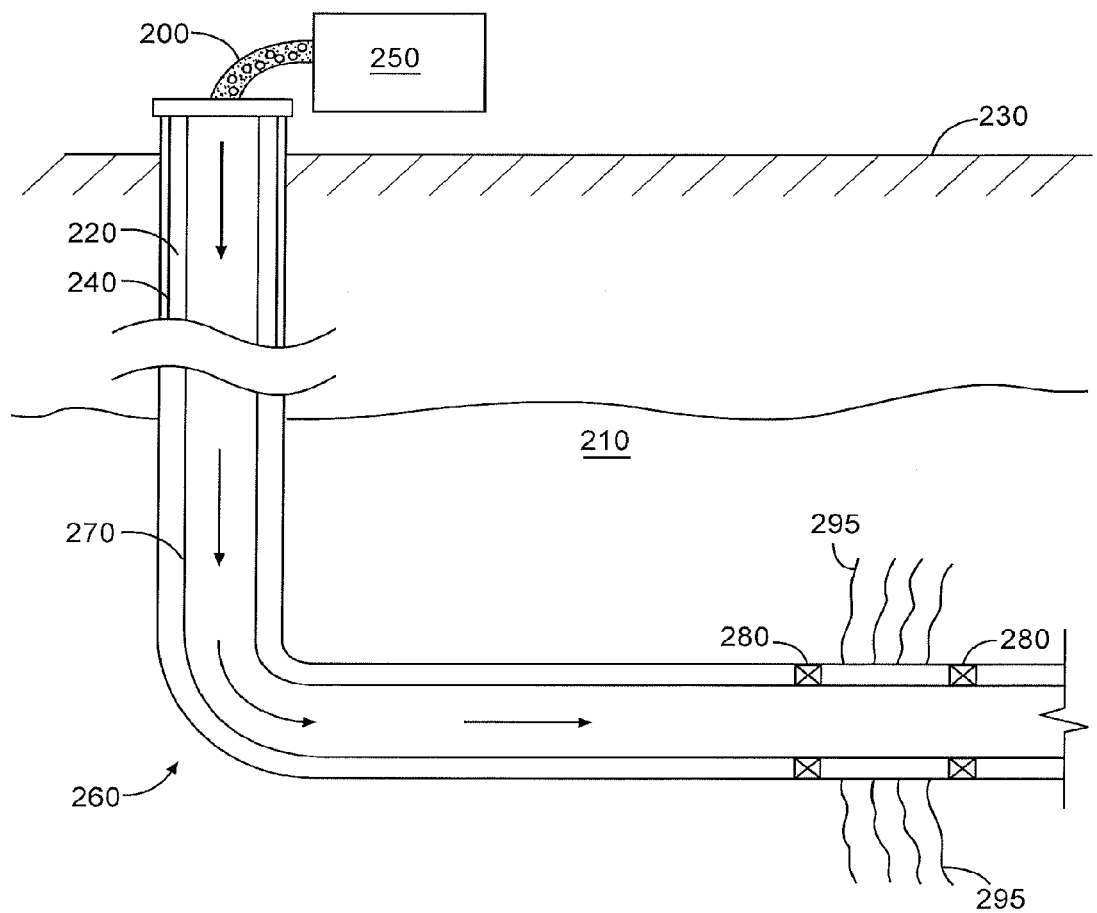
FIG. 2 is a diagram illustrating an example of a subterranean formation in which an acidizing treatment may be performed in accordance with certain embodiments of the present disclosure.

Certain embodiments of the methods and compositions disclosed herein may directly or indirectly affect one or more components or pieces of equipment associated with the preparation, delivery, recapture, recycling, reuse, and/or disposal of the disclosed compositions. For example, with reference to FIG. 2, the disclosed methods and compositions may directly or indirectly affect one or more components or pieces of equipment associated with an example of a well and treatment system, according to one or more embodiments. Referring now to FIG. 2, a well 260 is shown during an operation according to certain embodiments of the present disclosure in a portion of a subterranean formation of interest 210 surrounding a wellbore 220. The subterranean formation of interest 210 may comprise acid-soluble components. The subterranean formation may be a carbonate formation, sandstone formation, mixed carbonate-sandstone formation, or any other subterranean formation suitable for an acidizing treatment. The wellbore 220 extends from the surface 230 and through a portion of the subterranean formation 210 surrounding the horizontal portion of the wellbore. Although shown as vertical deviating to horizontal, the wellbore 220 may include horizontal, vertical, slant, curved, and other types of wellbore geometries and orientations, and the treatment may be applied to a subterranean zone surrounding any portion of the wellbore. The wellbore 220 can include a casing 240 that is cemented or otherwise secured to the wellbore wall. The wellbore 220 can be uncased or include uncased sections. Perforations can be formed in the casing 240 to allow fluids and/or other materials to flow into the subterranean formation 210. In cased wells, perforations can be formed using shape charges, a perforating gun, hydro jetting and/or other tools.

The well is shown with a work string 270 depending from the surface 230 into the wellbore 220. A pump and blender system 250 is coupled to the work string 270 to pump the acidizing fluid 200 into the wellbore 220. The working string 270 may include coiled tubing, jointed pipe, and/or other structures that allow fluid to flow into the wellbore 220. The working string 270 can include flow control devices, bypass valves, ports, and or other tools or well devices that control a flow of fluid from the interior of the working string 270 into the subterranean zone 210. For example, the working string 270 may include ports adjacent the wellbore wall to communicate the acidizing fluid 200 directly into the subterranean formation 210, and/or the working string 270 may include ports that are spaced apart from the wellbore wall to communicate the acidizing fluid 200 into an annulus in the wellbore 220 between the working string 270 and the wellbore wall.

The working string 270 and/or the wellbore 220 may include one or more sets of packers 280 that seal the annulus between the working string 270 and wellbore 220 and/or a downhole portion of the wellbore 220 to define an interval of the wellbore 220 into which particulate materials and/or treatment fluids will be pumped.

As shown, the wellbore 220 penetrates a portion 210 of the subterranean formation, which may include a hydrocarbon-bearing reservoir. In some cases, an acidizing fluid 200 may be pumped through the working string 270 and into the portion 210 of the formation. In some embodiments, the acidizing fluid 200 may create wormholes 295 in the portion 210 of the subterranean formation.

In some embodiments, the injection of the acidizing fluid 200 may be monitored at the well site. In some embodiments, wellbore conditions may be monitored during injection. In certain embodiments, monitored wellbore conditions may be used to determine updated injection rates with process 100 shown in FIG. 1. Examples of wellbore conditions that may be suitable for use in the methods of the present disclosure include, but are not limited to temperature, pressure, skin, fluid distribution, flow rate, pH, any physical or chemical property of the formation or formation fluids, and any combination thereof. For example, in certain embodiments, the injection rate could be updated with the methods of the present disclosure during injection using conditions such as fluid distribution and wellbore pressure.

In some embodiments, wellbore conditions of the present disclosure could be measured by sensors. In certain embodiments, sensors could be located in the wellbore. For purposes of this disclosure, the term "sensors" is understood to comprise sources (to emit and/or transmit energy and/or signals), receivers (to receive and/or detect energy and/or signals), and transducers (to operate as a source and/or receiver). In certain embodiments, information from the sensors may be fed into a system or tool that can determine an injection rate or rate profile according to the methods of the present disclosure.

In certain embodiments, acidizing fluids for use with the methods of the present disclosure may be selected based on the type of subterranean formation, desired stimulation, wellbore conditions, and other factors. In certain embodiments, acidizing fluids may comprise acids, chelating agents, additives, and the like, and any combination thereof. Examples of acids that may be suitable for use in the methods of the present disclosure include, but are not limited to hydrochloric acid ("HCl"), hydrofluoric acid, acetic acid, formic acid, sulfamic acid, chloracetic acid, carboxylic acids, organic acids, any other acid capable of dissolving the subterranean formation, and any combination thereof. Examples of chelating agents that may be suitable for use in the methods of the present disclosure include, but are not limited to ethylenediaminetetraacetic acid ("EDTA"), glutamic acid N,N-diacetic acid ("GLDA"), and the like, and any combination thereof.

The acidizing fluids of the methods of the present disclosure may comprise aqueous fluids, non-aqueous fluids, emulsified fluids, and any combinations thereof. Any pairs or combinations of substantially immiscible base fluids may be used in the methods and systems described herein, including, but not limited to "water-based" fluids and "oil-based fluids."

Aqueous or water-based fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate.

Examples of non-aqueous fluids (e.g., oil-based fluids) that may be suitable for use in the methods of the present disclosure include, but are not limited to oils, hydrocarbons, organic liquids, and the like. In certain embodiments, such fluids may comprise mineral oil based fluids or mineral oil/paraffin based fluids. In certain embodiments, the acidizing fluid may comprise an invert emulsion fluid, which comprises an oil or oleaginous fluid as the external or continuous phase and an aqueous or hydrophilic fluid as the internal phase. In certain embodiments, an oil-based invert emulsion-based treatment fluid may commonly comprise between about 50:50 to about 95:5 by volume oil phase to water phase. In certain embodiments, the invert emulsion fluid employs a natural oil (e.g., diesel oil or mineral oil) or a synthetic base as the oil or oleaginous phase, and an acid or chelating agent (with or without additives such as gelling agents, crosslinkers, corrosion inhibitors, etc.) as the non-oleaginous phase.

Examples of additives that may be suitable for use in the methods of the present disclosure include, but are not limited to surfactants, additional acids, fluid loss control additives, gas, nitrogen, carbon dioxide, foamers, corrosion inhibitors, corrosion inhibitor intensifiers, scale inhibitors, scale removing agents, catalysts, clay control agents, biocides, friction reducers, antifoam agents, bridging agents, flocculants, $H_2S$ scavengers, $CO_2$ scavengers, oxygen scavengers, lubricants, viscosifiers, gelling agents, breakers, weighting agents, relative permeability modifiers, wetting agents, coating enhancement agents, filter cake removal agents, antifreeze agents (e.g., ethylene glycol), diverting agents, particulates, and the like.

In certain embodiments, diverters may be used, among other reasons, to divert or distribute the acidizing fluids of the present disclosure. Diverters may be mechanical devices or chemical diverting agents and may used to ensure uniform injection over the area to be treated. In some embodiments, diverting agents known as chemical diverters function by creating a temporary blocking effect that is safely cleaned up following the treatment, enabling enhanced productivity throughout the treated interval.

In certain embodiments, experimentation may provide an indication of whether an injection rate or rate profile determined by the methods according to certain embodiments of the present disclosure would significantly affect stimulation for given conditions. In some embodiments, preliminary indicators may be indicative of whether an injection rate or rate profile determined by methods according to certain embodiments of the present disclosure would provide more effective stimulation than MAPDIR. In certain embodiments, preliminary indicators may be variables or functions. In certain embodiments, preliminary indicators are indicative of more effective stimulation if the preliminary indicators for given conditions exceed a preliminary indicator thresholds. Examples of preliminary indicators that may be suitable for some embodiments of the present disclosure include, but are not limited to a slope of a breakthrough curve, a minimum pore volume to breakthrough, a power of interstitial velocity in an equation for pore volume to breakthrough as a function of interstitial velocity, or any combination thereof.

In certain embodiments, numeric values for the preliminary indicators may be determined based on core flood experiments. For example, in certain embodiments, core flood experiments may be performed with an acidizing fluid and a core sample. Core flood experiments may comprise injecting the acidizing fluid into a sample of rock. The sample of rock may be a cylindrical rock core. In some embodiments, such experiments allow measurement of pressure drop, permeability, relative permeability, saturation change, formation damage caused by the fluid injection, time required to form wormholes of a particular length, pore volume to breakthrough, or interactions between the fluid and the rock. In certain embodiments, the core material may come from an oil reservoir or outcrop rock. The fluid in place at the start of the test is typically either a simulated formation brine, oil (either crude oil or refined oil), or a combination of brine and oil. Conditions of the core flood experiment may be ambient temperature, low confining pressure, or high temperature and pressure of a subject reservoir. Pressures and flow rates at both ends of the core are measured, and the core can also be investigated using other measurements such as nuclear magnetic resonance during the test. A core flood experiment helps evaluate the effect of injecting fluids specially designed to improve or enhance oil recovery.

Figure 3A:
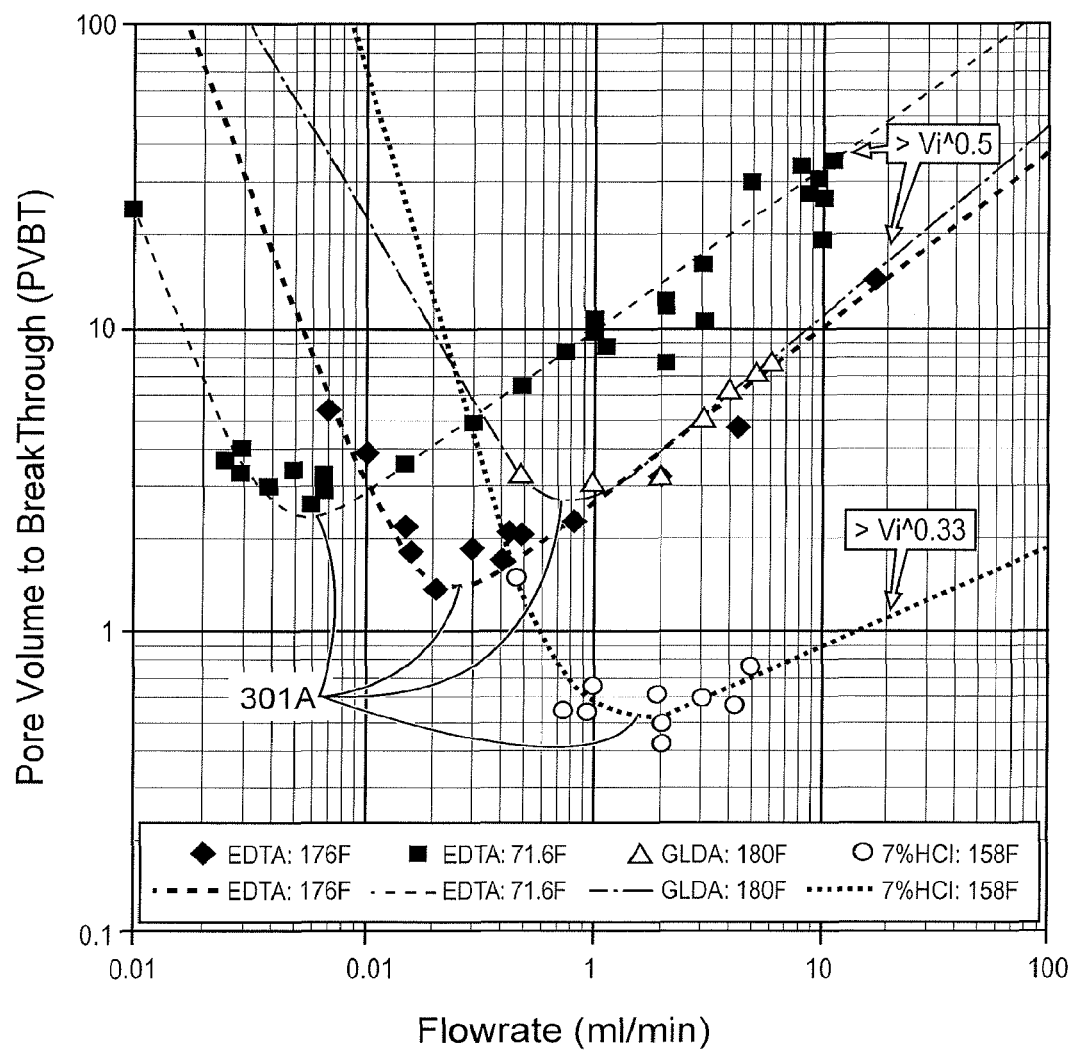
FIGS. 3A and 3B are graphs illustrating breakthrough curves for acidizing fluids in a core flood experiment, in accordance with certain embodiments of the present disclosure.
Figure 3B:
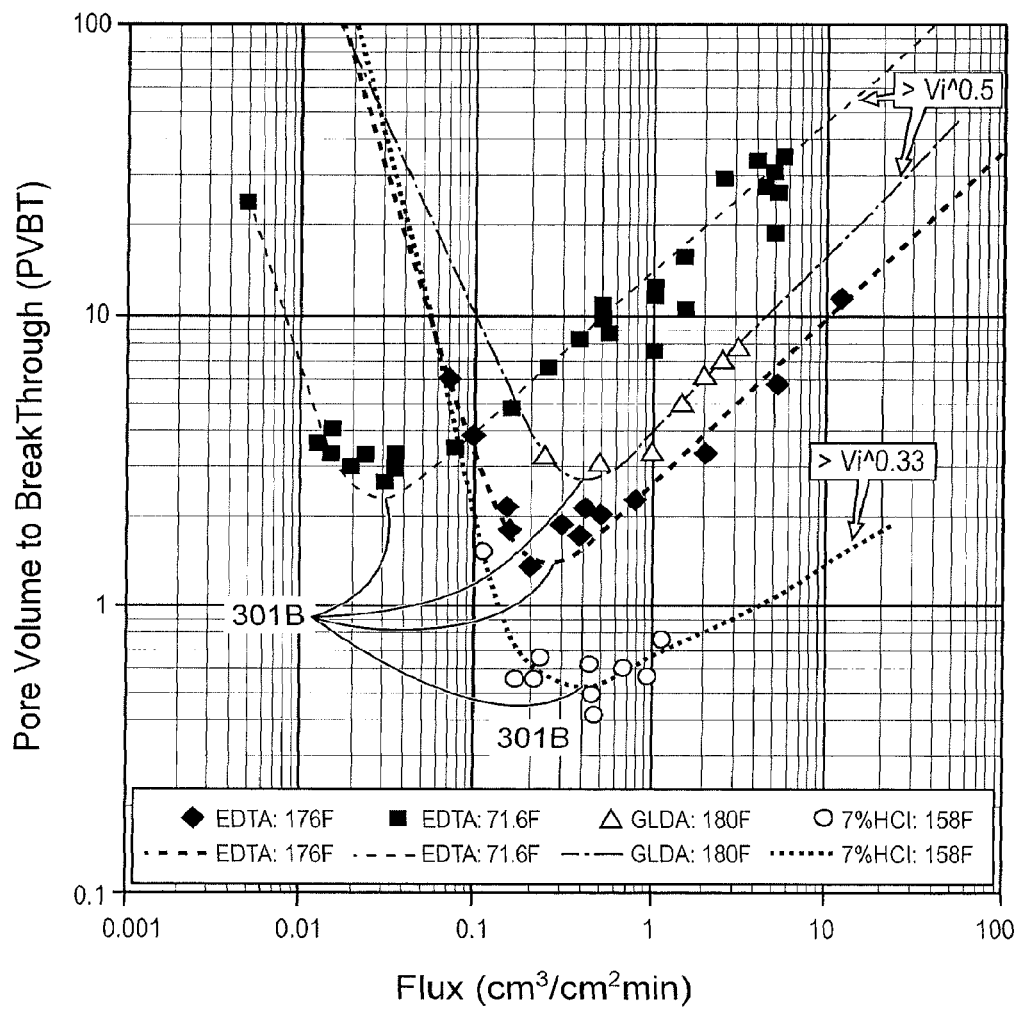

As used herein, "pore volume" is the volume of fluid that fills the portion of the subterranean formation to be treated or the volume of fluid that can be contained in the core sample used in the core flood experiment. Pore volumes to breakthrough ("PVBT") is a dimensionless value that represents the amount of acid needed to propagate the wormholes from the inlet of the core sample to the outlet. PVBT can be calculated by dividing the volume of acid needed to propagate the wormholes from the inlet to the outlet by the original pore volume of the core. For given conditions (e.g., temperature, flow rate, acidizing fluid, formation type), a lower PVBT indicates more efficient stimulation. By running core flood experiments at different flow rates, measuring the breakthrough volume, and calculating PVBT, an empirically-based breakthrough curve of PVBT versus flow rate or interstitial velocity can be determined. FIGS. 3A and 3B are graphs of core flood data and breakthrough curves of PVBT versus flow rate 3A and PVBT versus interstitial velocity 3B for EDTA at 71.6° F., EDTA at 176° F., GLDA at 180° F., and 7% HCl at 158° F.

In certain embodiments, breakthrough curves determined from core flood experiments may indicate whether an injection rate or rate profile determined by the methods of the present disclosure would provide more effective stimulation than MAPDIR. In certain embodiments, for example, the slope of the breakthrough curve may be a preliminary indicator. In certain embodiments, for example, the preliminary indicator threshold for the slope of the breakthrough curve is 0.15. In certain embodiments, if the slope of the breakthrough curve is higher than 0.15, an injection rate or rate profile determined by the process 100 in FIG. 1 will provide significantly more effective stimulation for a predefined fluid volume. The slope of a breakthrough curve may be determined by Equation (3):

$$\frac{(PVBT)_{minimum} - (PVBT)_{higher\ rate}}{(Vi)_{minimum\ rate} - (Vi)_{higher\ rate}} \quad (3)$$

where $(PVBT)_{minimum}$ the PVBT value at the minimum of the breakthrough curve, $(PVBT)_{higher\ rate}$ is the PVBT corresponding to a higher injection rate, $(Vi)_{minimum\ rate}$ is the interstitial velocity in the wormhole corresponding to $(PVBT)_{minimum}$, and $(N)_{higher\ rate}$ is the interstitial velocity corresponding to $(PVBT)_{higher\ rate}$. Interstitial velocity Vi is directly related to injection rate q by Equation (4):

$$Vi = \frac{q}{FA * \phi} \quad (4)$$

where FA is flow area and φ porosity. $(PVBT)_{minimum}$ can be determined from the minimum of the breakthrough curve, or by calculating it from $(Vi)_{minimum\ rate}$ using Equations (5) and (6) below. With reference to FIGS. 3A and 3B, the $(PVBT)_{minimum}$ is the value of the fitted EDTA, GLDA, and HCl breakthrough curves at their minimums 301A and 301B. $(Vi)_{minimum\ rate}$ may also be calculated by Equation (5):

$$(Vi)_{minimum\ rate} = \frac{1}{MF}\left(\frac{7}{2W_B}\right)^{2/3} \quad (5)$$

where MF is the morphology factor and $W_B$ is the wormhole beta factor. $W_B$ and MF can be taken from literature or determined empirically with a linear core flow test. MF depends on changes in rock structure through permeability and porosity.

In some embodiments, the magnitude of the $(PVBT)_{minimum}$ may be a preliminary indicator. In certain embodiments, for example, a preliminary indicator threshold for $(PVBT)_{minimum}$ may be 0.75. In some embodiments, if $(PVBT)_{minimum}$ is greater than 0.75, a calculated injection rate or rate profile may provide more effective stimulation than MAPDIR.

In certain embodiments, the power of interstitial velocity in an equation for PVBT as a function of interstitial velocity may be a preliminary indicator. In certain embodiments, the preliminary indicator threshold may be 0.1 or ⅓. In certain embodiments, if the power of interstitial velocity in an equation for PVBT as a function of interstitial velocity is greater than 0.1, then a calculated injection rate or rate profile may provide more effective stimulation than MAP-DIR.

In certain embodiments, a breakthrough curve may be fitted to PVBT versus flow rate data from core flood experiments. In certain embodiments, for example, Equation (6) may be fitted to the data:

$$PVBT = \frac{(Vi*MF)^x}{W_{\text{eff}}*MF*\left(1-e^{-W_B(Vi*MF)^{3/2}}\right)^2} \quad (6)$$

where Vi is the interstitial velocity of the fluid in a core sample used in liner core flood test or interstitial velocity in radial flow, $W_B$ is the wormhole beta factor, $W_{\text{eff}}$ is the wormhole efficiency factor, and x is a fitting variable. $W_{\text{eff}}$, $W_B$, and MF can be determined empirically from a core flood experiment. In certain embodiments, the other exponents of Equation (6) (x, 3/2, and 2) may also be changed to fit the breakthrough curve to experimental data. In certain embodiments, Equation (6) may be used to generate breakthroughs curve like those in FIGS. 3A and 3B.

In certain embodiments, x is a preliminary indicator, and a preliminary indicator threshold may be 0.1 or ⅓. In certain embodiments, for example, if the fitting variable x is greater than 0.1, the injection rate or rate profile determined by the methods of the present disclosure would provide more effective stimulation than MAPDIR.

In certain embodiments, determining whether an injection rate or rate profile determined by the methods of the present disclosure would significantly affect stimulation may comprise identifying $(PVBT)_{minimum}$, $(PVBT)_{higher\ rate}$, $(Vi)_{minimum\ rate}$, and $(Vi)_{higher\ rate}$. In some embodiments, identifying $(PVBT)_{minimum}$, $(PVBT)_{higher\ rate}$, $(Vi)_{minimum\ rate}$, and $(Vi)_{higher\ rate}$ may comprise estimating $(Vi)_{minimum\ rate}$ from Equation (5) or any other method and estimating $(PVBT)_{minimum}$, $(PVBT)_{higher\ rate}$, and $(Vi)_{higher\ rate}$ from Equation (6) or any other function used to relate PVBT and Vi directly or indirectly. In certain embodiments, determining whether an injection rate or rate profile determined by the methods of the present disclosure would significantly affect stimulation may comprise calculating a preliminary indicator value based on these variables and comparing the preliminary indicator value to the preliminary indicator threshold.

In certain embodiments, wormhole penetration depth may be determined based on wormhole velocity, Vwh. In some embodiments, Vwh may be related to PVBT and Vi by Equation (7):

$$PVBT = \frac{Vi}{Vwh}. \quad (7)$$

Figure 4:
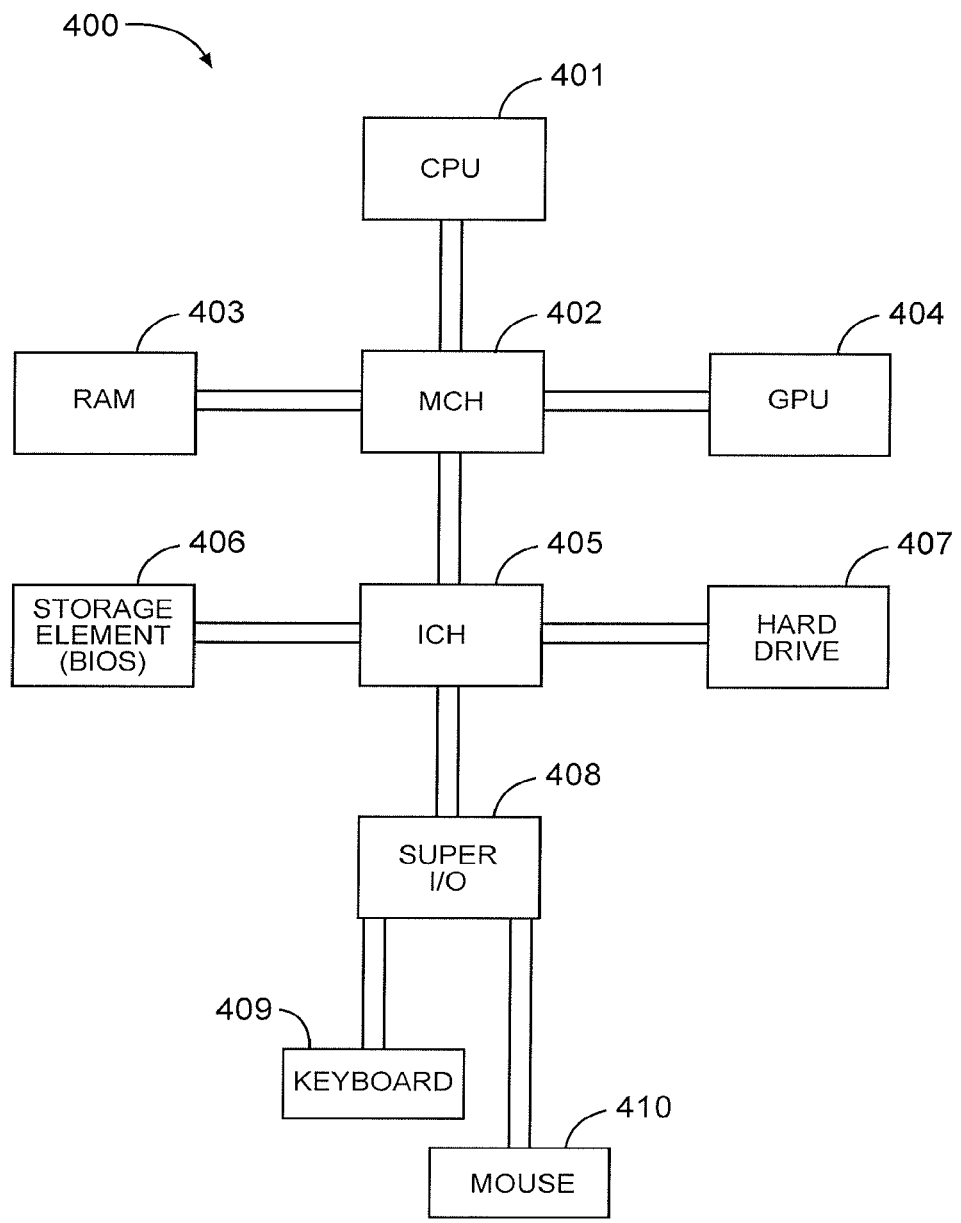
FIG. 4 is a diagram of an example information handling system, according to certain embodiments of the present disclosure.

FIG. 4 is a block diagram showing an example information handling system 400, according to aspects of the present disclosure. Information handling system 400 may be used, for example, to carry out one or more steps of the process flow of FIG. 1, calculate or fit Equations (1)-(7), and/or monitor and analyze core flood experiments. The information handling system 400 may comprise a processor or CPU 401 that is communicatively coupled to a memory controller hub or north bridge 402. Memory controller hub 402 may include a memory controller for directing information to or from various system memory components within the information handling system, such as RAM 403, storage element 406, and hard drive 407. The memory controller hub 402 may be coupled to RAM 403 and a graphics processing unit 404. Memory controller hub 402 may also be coupled to an I/O controller hub or south bridge 405. I/O hub 405 is coupled to storage elements of the computer system, including a storage element 406, which may comprise a flash ROM that includes a basic input/output system (BIOS) of the computer system. I/O hub 405 is also coupled to the hard drive 407 of the computer system. I/O hub 405 may also be coupled to a Super I/O chip 408, which is itself coupled to several of the I/O ports of the computer system, including keyboard 409 and mouse 710. The information handling system 400 further may be communicably coupled to one or more elements of a drilling system though the chip 408.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. It may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

The acidizing treatment simulations of Examples 1 and 2 were performed for hydrochloric acid and a chelating agent according to the pumping schedule in Table 1.

TABLE 1

| Stage # | Fluid | Volume (gal) | Coverage (gals/ft) |
|---|---|---|---|
| 1 | Hydrochloric acid or Chelating Agent | 1212 | 25 |
| 2 | Displacement | 5000 | N/A |

Example 1

Figure 5:
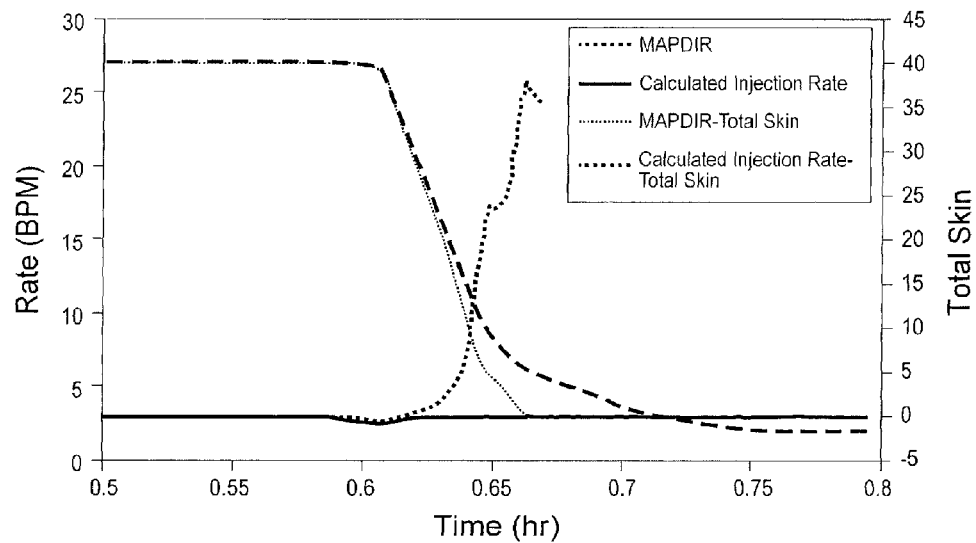
FIG. 5 is a graph illustrating data relating to total skin over time for a chelating agent injected at the maximum pressure differential and injection rate and according to an injection rate profile determined according to certain embodiments of the present disclosure.

In this example, a simulation was performed for a chelating agent injected into a sample of a subterranean formation spanning three reservoir layers of different permeability according to the MAPDIR and according to an injection rate profile determined by methods according to certain embodiments of the present disclosure. FIG. 5 shows the total skin profile for each injection rate. Table 2 below lists the final total skin for each injection rate. As shown in FIG. 5 and Table 2, the final total skin for the calculated rate profile was lower than the final total skin for the MAPDIR.

Example 2

Figure 6:
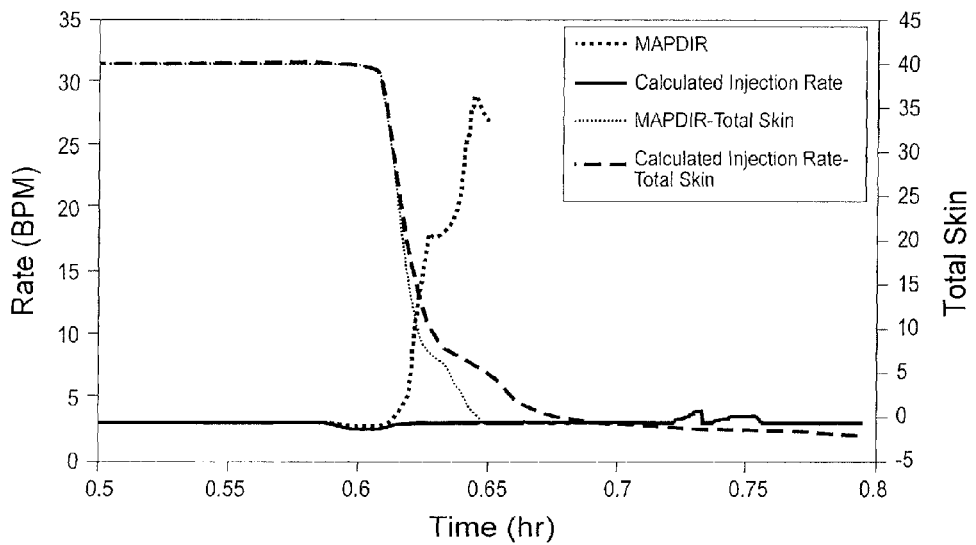
FIG. 6 is a graph illustrating data relating to total skin over time for hydrochloric acid injected at the maximum pressure differential and injection rate and according to an injection rate profile determined according to certain embodiments of the present disclosure.

In this example, a simulation was performed for hydrochloric acid injected into a sample of a subterranean formation spanning three reservoir layers of different permeability according to the MAPDIR and according to an injection rate profile determined by methods according to certain embodiments of the present disclosure. FIG. 6 shows that the total skin profile for each injection rate. As shown in FIG. 6 and Table 2, the final total skin for the calculated rate profile was lower than the final total skin for the MAPDIR.

TABLE 2

| Fluid | Rate | Final Total Skin |
|---|---|---|
| Chelating Agent | MAPDIR | −0.37 |
| Chelating Agent | Calculated Injection Rate Profile | −2.3 |
| Hydrochloric acid | MAPDIR | −0.26 |
| Hydrochloric acid | Calculated Injection Rate Profile | −1.77 |

Figure 7:
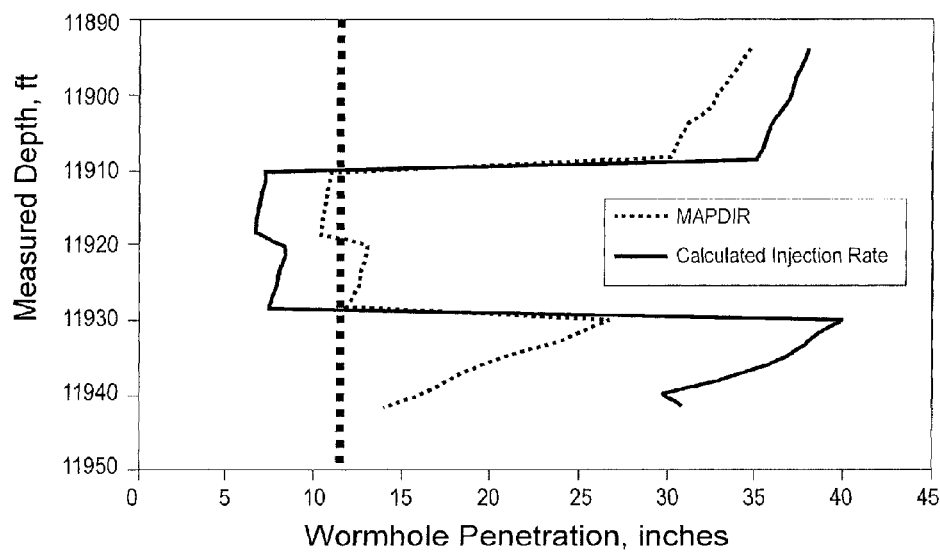
FIG. 7 is a graph illustrating data relating to wormhole penetration for hydrochloric acid injected at the maximum pressure differential and injection rate and according to an injection rate profile determined according to certain embodiments of the present disclosure.

In certain embodiments, the wormhole penetration may be calculated from PVBT and Vi according to Equation 7. FIG. 7 shows the final wormhole penetration for the calculated injection rate profile was deeper than final wormhole penetration for injection at MAPDIR at most of the measured depths.

The acidizing treatment simulations of Examples 3 and 4 were performed according to the pumping schedule in Table 3.

TABLE 3

| Stage # | Fluid | Volume (gal) | Coverage (gals/ft) |
|---|---|---|---|
| 1 | Hydrochloric acid or Chelating Agent | 2500 | 25 |
| 2 | Displacement | 4500 | N/A |

Example 3

Figure 8:
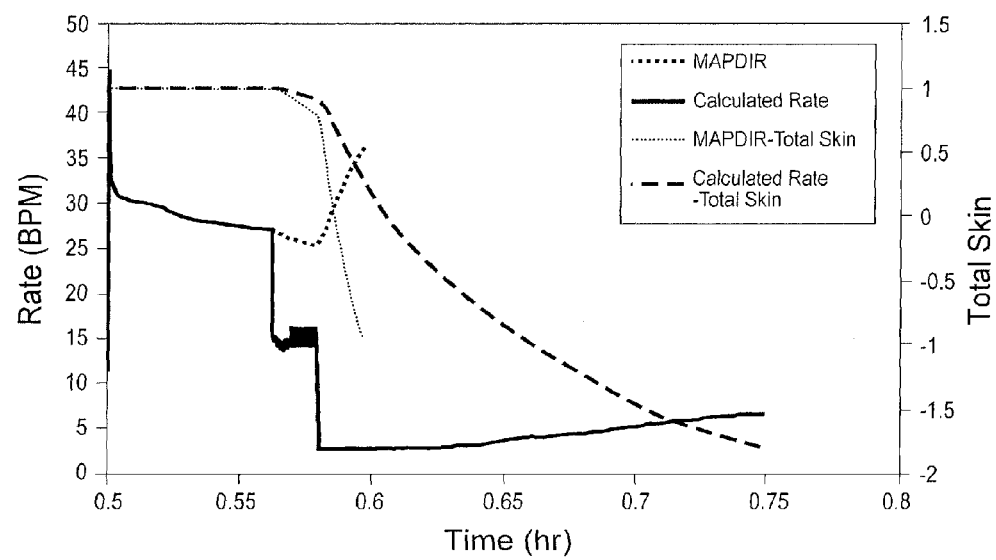
FIG. 8 is a graph illustrating data relating to total skin over time for a chelating agent injected at the maximum pressure differential and injection rate and according to an injection rate profile determined according to certain embodiments of the present disclosure.

In this example, a simulation was performed for hydrochloric acid injected into a sample of a subterranean formation spanning one reservoir layer according to the MAPDIR and an injection rate profile determined by methods according to certain embodiments of the present disclosure. FIG. 8 shows the total skin profile for each injection rate. Table 4 lists the final total skin for each injection rate. As shown in FIG. 8 and Table 4, the final total skin for the calculated injection rate profile was lower than the final total skin for MAPDIR.

Figure 9:
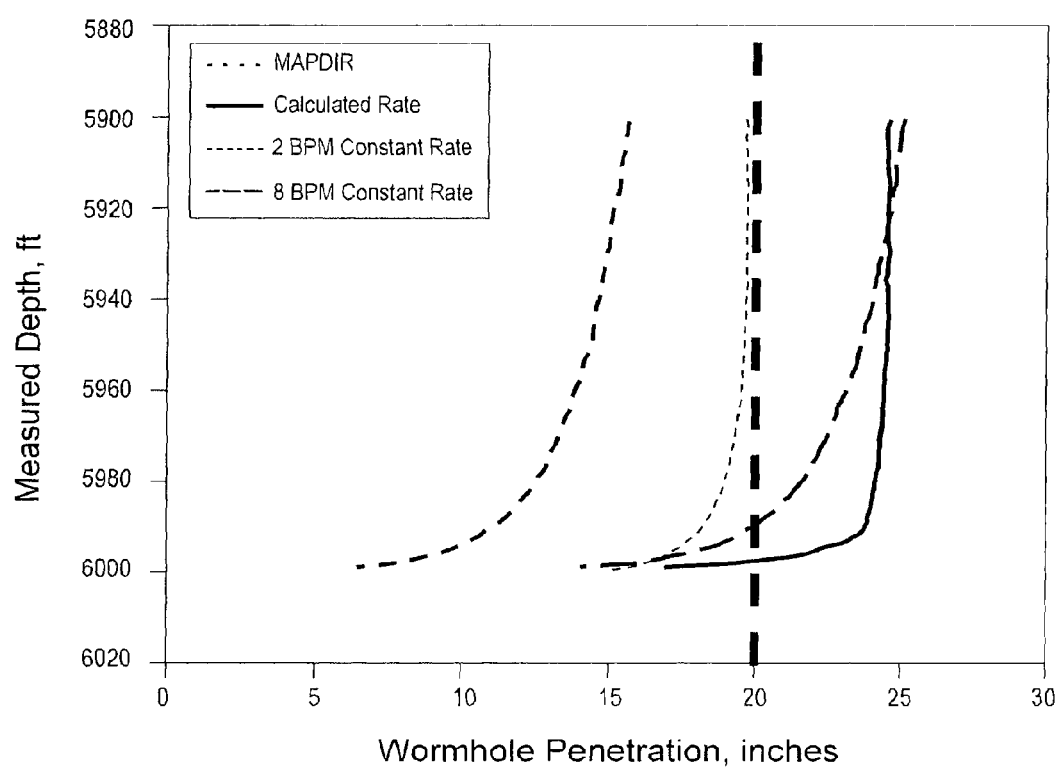
FIG. 9 is a graph illustrating data relating to wormhole penetration for a chelating agent injected at the maximum pressure differential and injection rate, at 2 barrels per minute, at 8 barrels per minute, and according to an injection rate profile determined according to certain embodiments of the present disclosure.

FIG. 9 shows the final wormhole penetration for the calculated rate profile was deeper than final wormhole penetration for MAPDIR and constant rates at all measured depths.

TABLE 4

| Fluid | Rate | Final Total Skin |
|---|---|---|
| Hydrochloric acid | MAPDIR | −0.95 |
| Hydrochloric acid | Calculated Injection Rate Profile | −1.78 |

Example 4

Figure 10:
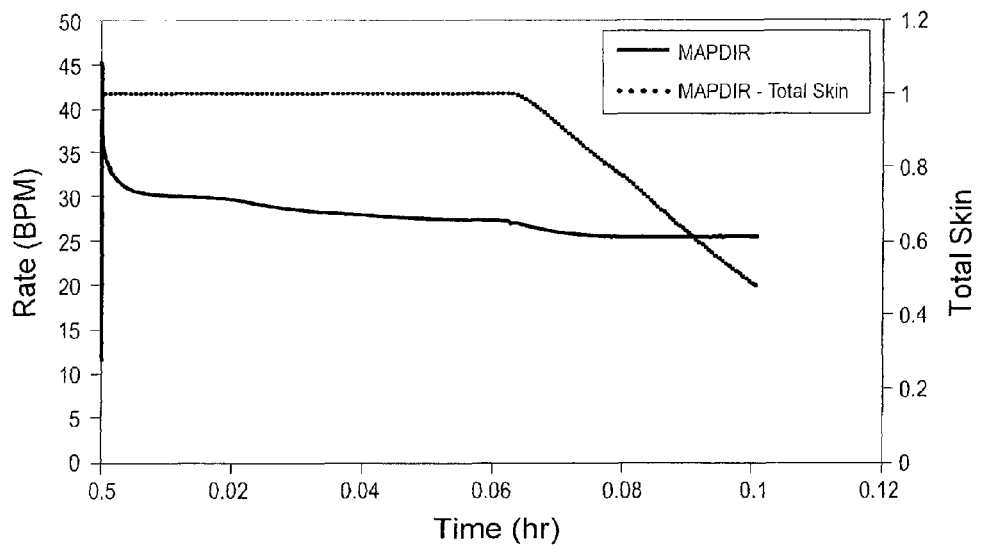
FIG. 10 is a graph illustrating data relating to total skin over time for a chelating agent injected at maximum pressure differential and injection rate according to certain embodiments of the present disclosure.
Figure 11:
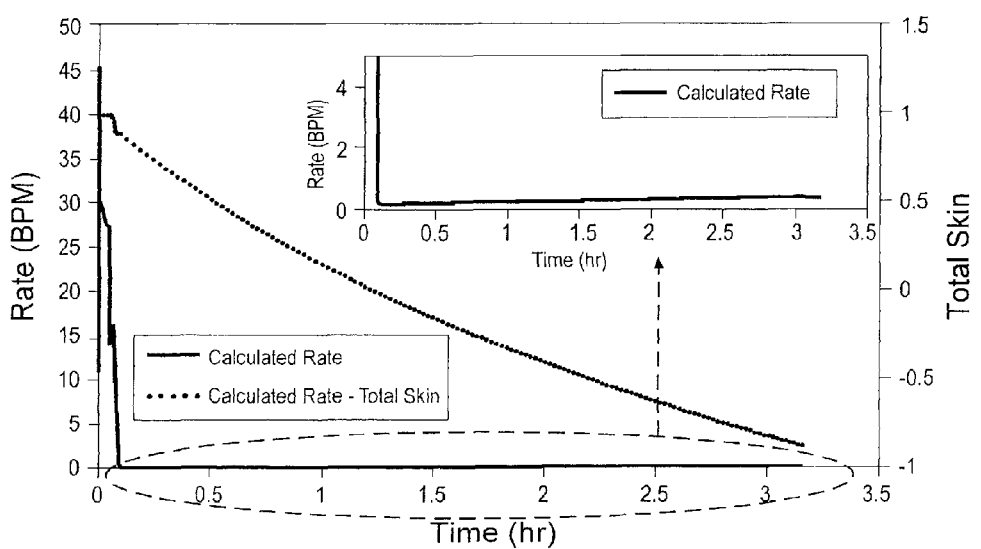
FIG. 11 is a graph illustrating data relating to total skin over time for a chelating agent injected according to an injection rate profile determined according to certain embodiments of the present disclosure.

In this example, a simulation was performed for a chelating agent injected into a sample of a subterranean formation spanning one reservoir layer according to the MAPDIR and an injection rate profile determined by methods according to certain embodiments of the present disclosure. FIG. 10 shows the total skin profile for the MAPDIR. FIG. 11 shows the total skin profile for the calculated injection rate profile. Table 5 lists the final total skin for each injection rate. As shown in FIG. 10, 11 and Table 5, the final total skin for the calculated injection rate profile was lower than the final total skin for MAPDIR.

Figure 12:
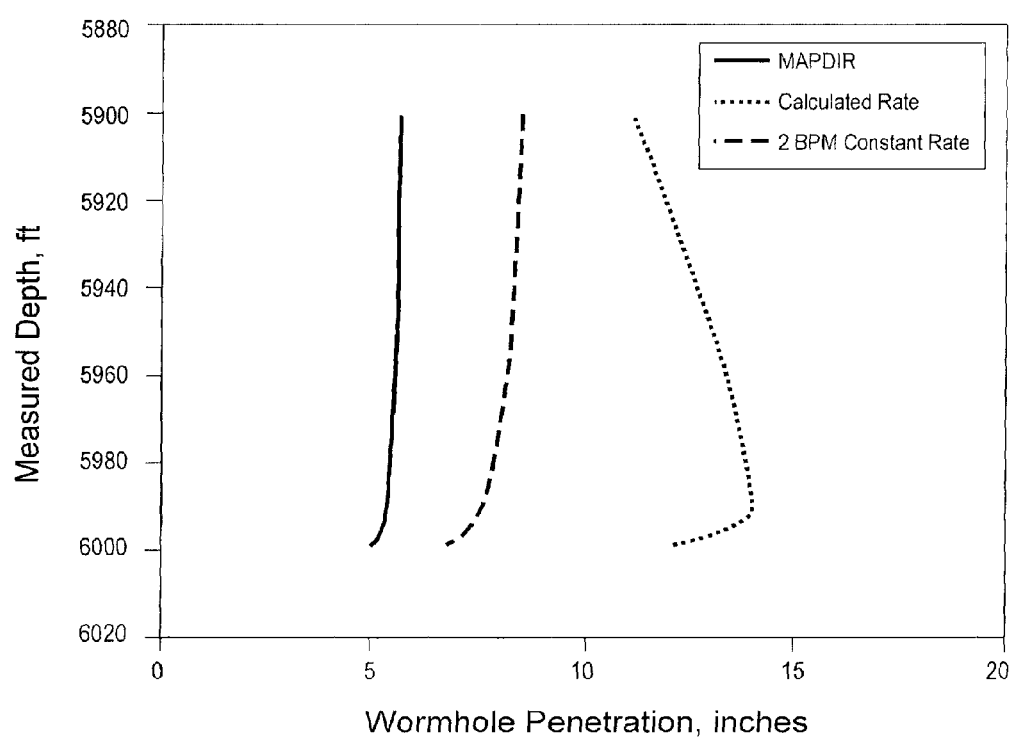
FIG. 12 is a graph illustrating data relating to wormhole penetration for a chelating agent injected at the maximum pressure differential and injection rate, at 2 barrels per minute, and according to an injection rate profile determined according to certain embodiments of the present disclosure.

FIG. 12 shows the final wormhole penetration for the calculated rate profile was deeper than final wormhole penetration for MAPDIR and a constant rate at all measured depths.

TABLE 5

| Fluid | Rate | Final Total Skin |
|---|---|---|
| Chelating Agent | MAPDIR | 0.47 |
| Chelating Agent | Calculated Injection Rate Profile | −0.87 |

An embodiment of the present disclosure is a method comprising: selecting a first injection rate for injecting an acidizing fluid into a subterranean formation; calculating a first objective function based on the first injection rate; selecting a second injection rate for injecting the acidizing fluid into the subterranean formation; calculating a second objective function based on the second injection rate; comparing the second objective function with the first objective function to determine whether the second objective function is indicative of more effective stimulation, less effective stimulation, or the same stimulation as the first objective function; if the second objective function is indicative of more effective stimulation than the first objective function, then comparing the second objective function to a third objective function calculated based on a third injection rate; and if the second objective function is indicative of the same stimulation or less effective stimulation than the first objective function, then selecting a design rate for injecting the acidizing fluid into the subterranean formation based on the first injection rate.

An embodiment of the present disclosure is a method comprising: selecting a first injection rate for injecting an acidizing fluid into a subterranean formation for each of a plurality of volume fractions and calculating a first objective function based on the first injection rate; selecting a second injection rate for injecting the acidizing fluid into the subterranean formation for each of the plurality of volume fractions and calculating a second objective function based on the second injection rate; comparing the second objective function with the first objective function for each of the plurality of volume fractions to determine whether the second objective function is indicative of more effective stimulation, less effective stimulation, or the same stimulation as the first objective function; if the second objective function is indicative of more effective stimulation than the first objective function, then comparing the second objective function to a third objective function calculated based on a third injection rate for each of the plurality of volume fractions; and if the second objective function is indicative of the same stimulation or less effective stimulation than the first objective function, selecting a design rate for each of the plurality of volume fractions for injecting the acidizing fluid into the subterranean formation based on the first injection rate for each of the plurality of volume fractions; determining a design rate profile based on the design rates selected for each of the plurality of volume fractions.

An embodiment of the present disclosure is a method comprising: selecting one or more preliminary indicators; determining one or more numeric values for the preliminary indicators for an acidizing fluid and a subterranean formation; comparing the one or more numeric values for the preliminary indicators to one or more preliminary indicator thresholds; determining based on the comparison of the numeric values for the preliminary indicators and the preliminary indicator thresholds whether to inject the acidizing fluid according to a maximum pressure differential and injection rate or according to one of a design rate or a design rate profile; and injecting the acidizing fluid according to the design rate, design rate profile, or the maximum pressure differential and injection rate.

An embodiment of the present disclosure is a non-transitory computer readable medium containing a set of instructions that, when executed by a processor of an information handling system, cause the processor to select a first injection rate for injecting an acidizing fluid into a subterranean formation; calculate a first objective function based on the first injection rate; select a second injection rate for injecting the acidizing fluid into the subterranean formation; calculate a second objective function based on the second injection rate; compare the second objective function with the first objective function to determine whether the second objective function is indicative of more effective stimulation, less effective stimulation, or the same stimulation as the first objective function; if the second objective function is indicative of more effective stimulation than the first objective function, then compare the second objective function to a third objective function calculated based on a third injection rate; and if the second objective function is indicative of the same stimulation or less effective stimulation than the first objective function, then select a design rate for injecting the acidizing fluid into the subterranean formation based on the first injection rate.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    selecting a first injection rate for injecting an acidizing fluid into a subterranean formation;
    calculating a first objective function based on the first injection rate;
    selecting a second injection rate for injecting the acidizing fluid into the subterranean formation;
    calculating a second objective function based on the second injection rate;
    comparing the second objective function with the first objective function to determine whether the second objective function is indicative of more effective stimulation, less effective stimulation, or the same stimulation as the first objective function;
    if the second objective function is indicative of more effective stimulation than the first objective function, then comparing the second objective function to a third objective function calculated based on a third injection rate;
    if the second objective function is indicative of the same stimulation or less effective stimulation than the first objective function, then selecting a design rate for injecting the acidizing fluid into the subterranean formation based on the first injection rate; and
    injecting the acidizing fluid into the subterranean formation at the design rate.

2. The method of claim 1, further comprising monitoring the subterranean formation during the injecting and adjusting the injecting based on the monitoring.

3. The method of claim 1, wherein if the third objective function is indicative of more effective stimulation than the second objective function, the method further comprises: repeating the steps of selecting an injection rate, calculating an objective function, and comparing the objective functions for additional injection rates.

4. The method of claim 1, wherein calculating objective functions further comprises determining a wellbore pressure and a fluid distribution.

5. The method of claim 1, wherein selecting a second injection rate comprises:
    calculating a higher objective function based on an injection rate higher than the first injection rate; and
    selecting a second injection rate based on the higher objective function.

6. The method of claim 1, wherein selecting a second injection rate comprises:
    calculating a lower objective function based on an injection rate lower than the first injection rate; and
    selecting a second injection rate based on the lower objective function.

7. The method of claim 1, wherein the objective functions are selected from the group consisting of: a total interval skin function, a total wellbore skin function, an individual layer skin function, a wormhole penetration function, a cumulative wormhole penetration function, a function for fluid placement in a layer, and any combination thereof.

8. A method comprising:
   selecting a first injection rate for injecting an acidizing fluid into a subterranean formation for each of a plurality of volume fractions and calculating a first objective function based on the first injection rate;
   selecting a second injection rate for injecting the acidizing fluid into the subterranean formation for each of the plurality of volume fractions and calculating a second objective function based on the second injection rate;
   comparing the second objective function with the first objective function for each of the plurality of volume fractions to determine whether the second objective function is indicative of more effective stimulation, less effective stimulation, or the same stimulation as the first objective function;
   if the second objective function is indicative of more effective stimulation than the first objective function, then comparing the second objective function to a third objective function calculated based on a third injection rate for each of the plurality of volume fractions;
   if the second objective function is indicative of the same stimulation or less effective stimulation than the first objective function, selecting a design rate for each of the plurality of volume fractions for injecting the acidizing fluid into the subterranean formation based on the first injection rate for each of the plurality of volume fractions;
   determining a design rate profile based on the design rates selected for each of the plurality of volume fractions; and
   injecting the treatment fluid into the subterranean formation according to the design rate profile.

9. The method of claim 8, wherein if the third objective function is indicative of more effective stimulation than the second objective function for one or more volume fractions, the method further comprises: repeating the steps of selecting an injection rate, calculating an objective function, and comparing the objective functions for additional injection rates for each of the one or more volume fractions.

10. The method of claim 8, wherein selecting a second injection rate comprises:
    calculating a higher objective function based on an injection rate higher than the first injection rate; and
    selecting a second injection rate based on the higher objective function.

11. The method of claim 8, wherein selecting a second injection rate comprises:
    calculating a lower objective function based on an injection rate lower than the first injection rate; and
    selecting a second injection rate based on the lower objective function.

12. The method of claim 8, wherein calculating at least one of the objective functions comprises determining a wellbore pressure and a fluid distribution.

13. A method comprising:
    selecting one or more preliminary indicators;
    determining one or more numeric values for the preliminary indicators for an acidizing fluid and a subterranean formation;
    comparing the one or more numeric values for the preliminary indicators to one or more preliminary indicator thresholds;
    determining based on the comparison of the numeric values for the preliminary indicators and the preliminary indicator thresholds whether to inject the acidizing fluid according to a maximum pressure differential and injection rate or according to one of a design rate or a design rate profile; and
    injecting the acidizing fluid according to the design rate, design rate profile, or the maximum pressure differential and injection rate.

14. The method of claim 13, further comprising calculating the design rate or design rate profile.

15. The method of claim 13, wherein the preliminary indicators are indicative of whether the design rate or design rate profile would result in more effective stimulation of the subterranean formation than the maximum pressure differential and injection rate.

16. The method of claim 13, wherein the preliminary indicators are selected from the group consisting of: a slope of a breakthrough curve, a minimum pore volume to breakthrough, a power of interstitial velocity in an equation for pore volume to breakthrough as a function of interstitial velocity, or any combination thereof.

17. The method of claim 16, wherein the one or more preliminary indicator values are selected from the group consisting of: 0.15 for the slope of the breakthrough curve, 0.75 for the minimum pore volume to breakthrough, and 0.1 for the power of interstitial velocity in an equation for pore volume to breakthrough as a function of interstitial velocity, or any combination thereof.

18. The method of claim 13, wherein the step of determining based on the comparison of the preliminary indicator values and the preliminary indicator thresholds whether to inject the acidizing fluid according to a maximum pressure differential and injection rate or according to a design rate or a design rate profile further comprises calculating the design rate profile if at least one preliminary indicator value exceeds the corresponding preliminary indicator threshold.

* * * * *